United States Patent [19]

Matulewicz et al.

[11] Patent Number: 4,514,315

[45] Date of Patent: Apr. 30, 1985

[54] ALUMINUM CORROSION INHIBITOR COMPRISING ALKYLENE-SILANE GRAFT COPOLYMER

[75] Inventors: William N. Matulewicz, Montgomery; Paul H. Mohr, Chappaqua; Paul L. Matlock, Ossining, all of N.Y.

[73] Assignee: Union Carbide Corporation, Danbury, Conn.

[21] Appl. No.: 508,179

[22] Filed: Jun. 27, 1983

[51] Int. Cl.$^3$ ................................................ C09K 5/00
[52] U.S. Cl. ..................................... 252/75; 252/78.3; 252/389 R; 556/444
[58] Field of Search .................... 252/75, 78.3, 389.31; 556/444

[56] References Cited

U.S. PATENT DOCUMENTS

| | | | |
|---|---|---|---|
| 2,917,480 | 12/1959 | Bailey et al. | 252/78.3 |
| 3,234,144 | 2/1966 | Morehouse | 252/78.3 |
| 3,234,252 | 2/1966 | Pater | 252/49.3 |
| 3,418,354 | 12/1968 | Wheeler | 556/444 |
| 3,957,842 | 5/1976 | Prokai et al. | 556/444 |
| 4,146,488 | 3/1979 | Martin | 252/34.7 |
| 4,210,548 | 7/1980 | Hirozawa et al. | 252/75 |
| 4,392,972 | 7/1983 | Mohr et al. | 252/75 |

*Primary Examiner*—Paul Lieberman
*Assistant Examiner*—R. A. Wax
*Attorney, Agent, or Firm*—Dale Lynn Carlson

[57] ABSTRACT

An aluminum corrosion inhibitor composition comprising an aqueous and/or alcohol solution of an alkylene silane grafted polyether together with a method for using such composition.

31 Claims, No Drawings

ALUMINUM CORROSION INHIBITOR COMPRISING ALKYLENE-SILANE GRAFT COPOLYMER

BACKGROUND OF THE INVENTION

Grafted polymers are known in the art. By way of illustration, U.S. Pat. No. 3,418,354 discloses siloxane-polyalkylene oxide graft copolymers made using siloxanes having at least two olefinic groups. The copolymers of the U.S. Pat. No. 3,418,354 are disclosed therein as being useful as surfactants.

As another illustration, U.S. Pat. No. 4,146,488 discloses metal lubricant compositions containing poly(oxyalkylene) compounds grafted with about 3 to 15% by weight of acrylic or methacrylic acid followed by neutralization with alkanolamine. That patent discloses at column 7, lines 50 to 68 and column 8, lines 1 to 15, that such a polymer, when used in aqueous monoethanolamine borate solution is effective in providing cast iron corrosion protection.

Co-pending U.S. application Ser. No. 335,614 (now U.S. Pat. No. 4,392,972) discloses that aqueous and/or alcohol solutions of a certain class of such acrylic acid graft polymers have a particularly beneficial effect in inhibiting aluminum corrosion, most notably with respect to an aggressive form of aluminum corrosion, namely that which occurs at "heat rejecting" aluminum surfaces such as solar panels and the cylinder heads and blocks of internal combustion engines. This finding is particularly significant in view of the fact that there is increasing reliance on the use of aluminum components in the manufacture of heat transfer systems, such as those in solar and automotive systems, as part of an overall trend toward weight reduction.

Further improvements in aluminum corrosion inhibitor above and beyond those shown for the above cited grafted polymers would be desirable.

OBJECT OF THE INVENTION

It is an object of the present invention to provide an aluminum corrosion inhibitor composition comprising an aqueous and/or alcohol solution of a alkylene silane grafted polyether together with a method for using such composition.

This and other objects will become apparent from a reading of the following detailed specification.

SUMMARY OF THE INVENTION

In one aspect, the present invention relates to an aluminum corrosion inhibitor composition that is useful inter alia in heat transfer systems such as those found in solar and automotive systems. When used in an automobile, the composition can be added directly to the automobile coolant system via the radiator filler neck as is done with conventional antifreezes.

The composition of the present invention comprises:
(a) alcohol or water or mixtures thereof, and
(b) an alkylene silane grafted polyether comprising the reaction product of an unsaturated grafting silane such as vinyltrimethoxysilane, allytriethoxysilane, isopentenylsilane, and the like, and a base polyether compound.

A well-known commercial class of these polyether compounds is the poly(oxyalkylene)s represented by the formula:

$$R''((OC_nH_{2n})_zOR')_a$$

wherein R' is a member selected from the group consisting of a hydrocarbon radical, a hydrogen atom, or an acyl radical and R'' is a member selected from the group consisting of a hydrocarbon radical, a hydrogen atom, an amine-containing radical, or an acyl radical, a is an integer having a value of 1 to about 4, n has a value of 2 to 4 inclusive, z is an integer having a value of from 4 to 2300 inclusive, and preferably 8 to about 230, said base polymer having a number average molecular weight of between about 200 and 100,000 and wherein the amount of component (b) is between greater than about 0.01 wt. % and about 20 wt. % (preferably from about 0.1 wt. % to about 15 wt. %), based on the total amount of component (a) plus component (b) in said composition. The amount of silane monomer that can be grafted can be up to 60 wt. % of the total weight of the grafted polyether.

The above specified limits on percent graft of the grafted polymer, molecular weight of the base polymer and relative amounts of components (a) and (b) are deemed to define the operable limits within which an effective aluminum corrosion inhibitor composition within the scope of the present invention is provided. When operating below the minimum specified limits on component (b) effective aluminum corrosion inhibition cannot be expected and, when operating above the maximum specified amounts, undesirable physical (e.g. viscosity) changes in the composition are likely to occur.

In another aspect, the alkylene silane grafted polyether can, if desired, be equilibrated (e.g. partially or wholly neutralized with a base, saponified or esterified). Such neutralization can take place before or after addition of the grafted polymer to form the concentrate or solution of the invention. Equilibration can be effected by adding to the composition of the present invention ammonium hydroxides, alkali metal hydroxides (e.g., sodium or potassium hydroxide) alkaline earth metal hydroxides; or amines (e.g., triethanolamine); or mixtures thereof.

In another aspect, the invention encompasses methods for making the above composition, either by direct addition of the alkylene silane grafted polyether to water and/or alcohol or by adding the water and/or alcohol to the alkylene silane grafted polyether or by pre-forming a composition concentrate. The corrosion inhibitor composition can be made from the composition concentrate by dilution of the concentrate with water and/or alcohol at the use site. In the concentrate, the amount of component (b) employed is between greater than about 0.01 wt. % and about 20 wt. % based on the total amount of component (a) plus component (b) in said composition.

DETAILED DESCRIPTION OF THE INVENTION

The weight ratio of alcohol to water in the composition of the present invention can vary over a wide range. Such mixture can have a water to alcohol weight ratio ranging from 100:0 to 0:100.

As used herein, the term "alcohol" is intended to encompass alcohols, such as methanol and ethanol; as well as glycols, such as ethylene glycol diethylene glycol, propylene glycol and dipropylene glycol; glycol monoethers such as the methyl, ethyl, propyl and butyl ether of ethylene glycol, diethylene glycol, propylene glycol and dipropylene glycol; and glycol diethers such as the methyl (and ethyl diethers of ethylene glycol, diethylene glycol and dipropylene glycol.

The preferred polyethers, i.e., the poly(alkylene oxide) compounds, used in this invention are known in the art. These are commonly produced by reacting an alkylene oxide or a mixture of alkylene oxides, added sequentially or in combination, with water, an alcohol, an amine, and/or an alkanolamine. Such alcohols can be monohydric or polyhydric and correspond to the formula $R''(OH)_a$ wherein $R''$ and "a" are as defined above. Such alcohols include methanol, ethanol, propanol, butanol, ethylene glycol, glycerol, the monoethylether of glycerol, the dimethylether of glycerol, sorbitol, 1,2,6-hexanetriol, trimethylolpropane, and the like, and such alkanolamines include ethanolamine, diethanolamine, monopropanolamine, and the like.

Generally, these poly(oxyalkylene) compounds have molecular weights (number average) in the range of about 200 to about 100,000, preferably from 200 to about 10,000.

The grafting of the alkylene silane onto the poly(oxyalkylene) compounds can be carried out by, but is not limited to, free radical polymerization, as is known in the art, to afford a grafted silane content of up to about 60%, (preferably between about 1% and about 60%, more preferably between about 1% and 20% graft). Any percent graft is seen to provide corrosion inhibition advantages within the scope of the present invention. However, when using a grafted polymer having greater than about 60% graft, an unduly high viscosity for the grafted polymer is likely.

Useful grafting silanes would include, for example, vinyltrimethoxysilane, allyltriethoxysilane, isopentenylsilane, and the like. These and other illustrations of useful grafting silanes are the following:

$CH_2=CHSi(OR)_{(3-x)}R'''_x$;
$CH_2=CHCH_2Si(OR)_{(3-x)}R'''_x$;
$(CH_2=CHCH_2)_2Si(OR)_{(2-y)}R'''_y$;
$CH_2=C(CH_3)CH_2Si(OR)_{(3-x)}R'''_x$;
$CH_3CH=CHCH_2Si(OR)_{(3-x)}R'''_x$;
$(CH_3)_2C=CHSi(OR)_{(3-x)}R'''_x$;
$CH_2=CH(CH_2)_6Si(OR)_{(3-x)}R'''_x$;
$CH_2=CH-CH=CHSi(OR)_{(3-x)}R'''_x$;
$CH_2=CH-C_6H_4Si(OR)_{(3-x)}R'''_x$ where R and R''' are monofunctional hydrocarbons containing 1 to 6 carbon atoms and x=0, 1, 2 or 3 and y=0, 1 or 2.

The preferred poly(oxyalkylene) compounds useful in the present invention are the well-known poly(oxyethylene-oxypropylene) polymers, having a weight ratio of oxyethylene ("EO") to oxypropylene ("PO") of between 0:100 and 100:0.

Optional additives may be employed in minor amounts of less than 50 wt. percent based on the weight of the aqueous or alcohol composition. Typical optional additives would include, for example, known corrosion inhibitors for aluminum or other metals useful in corrosion inhibition such as, for example, molybdates, borates, silicates, phosphates and benzoates, hydroxy benzoates or acids thereof, silicones (such as those disclosed in U.S. Pat. Nos. 3,337,496; 4,093,641; 4,149,985; and, 4,367,254, all incorporated herein by reference), alkali metal nitrates, alkali metal nitrites, diisopropylamine nitrite, dicyclohexylamine nitrate, tolyltriazole, mercaptobenzothiazole, benzotriazole, and the like, or mixtures thereof. If one or more of the known inhibitors are employed together with the inhibitors of the present invention, the sum total of all inhibitors should be used in an "inhibitory effective amount", i.e., an amount sufficient to provide some corrosion inhibition with respect to the aluminum surfaces to be protected. Other typical optional additives would include wetting agents and surfactants such as, for example, known ionic and non-ionic surfactants such as the poly(oxyalkylene) adducts of fatty alcohols; antifoams and/or lubricants such as the well-known polysiloxanes and the polyoxyalkylene glycols, as well as any other minor ingredients known in the art that do not adversely effect the aluminum corrosion resistance sought to be achieved.

As used herein, the term "percent silane graft" designates such graft on a weight basis.

As used herein, the term "alkylene silane" designates any alkylene-containing silane.

The following example is intended to illustrate, but in no way limit, the present invention.

EXAMPLE 1

A. Preparation of Silane Grafted Polymer

A silane grafted polymer within the scope of the present invention was prepared using vinyltrimethylsilane and a base polymer consisting of butanol started poly(oxyethylene-oxypropylene) polymer having a molecular weight of 4000 and a viscosity of 5100 Saybolt seconds at 100° F. as follows:

Into a 1-liter, 3-neck, round bottom flask fitted with a water condenser, thermocouple, stirrer, and means of introducing the silane and/or peroxide catalyst, was placed 455.39 grams of the polymer. By means of a heating mantle, the flask was heated to a temperature of 150° C., followed by the addition of 5 mililiters of tertiary-butyl perbenzoate and 45 mililiters of vinyltrimethoxysilane. The peroxide feed was begun 15 minutes prior to starting the silane feed and lasted for 140 minutes. The total feed time for the silane was 105 minutes. After the total feed of silane and peroxide was completed, the resulting product (herein "Grafted Polymer A") was allowed to cool to room temperature.

Carbon-13 NMR analysis verified that grafting had taken place. 6.0% of the oxypropylene units of the base polymer were grafted with the vinyltrimethyloxy silane. However, this method could not determine the percent graft of silane onto the oxyethylene units.

Grafted Polymer A is summarized in Table I.

TABLE I

| Grafted Polymer | Grafted Silane | % Graft | Base Polymer Properties | | | |
|---|---|---|---|---|---|---|
| | | | Starter | EO/PO | Mol. Wt. | Viscosity (SUS at 100° F.) |
| A | vinyltri methoxy silane | 10 | butyl alcohol | 50/50 | 4000 | 5100 |

The above silane grafted polymer was tested in solution employing the following formulation:

| FORMULATION | |
|---|---|
| COMPONENT | Wt. % |
| Ethylene glycol | 90.9273 |
| Boric Acid | 0.4048 |
| 75% H$_3$PO$_4$ | 1.6877 |
| 45% KOH | 3.8802 |
| Total Wt. % | 96.9000 |

To the above formulation was added the individual silane grafted polymer in an amount as specified in Table II below. Additional ethylene glycol was then added as required to provide 100 wt. percent of a concentrate.

The concentrates were diluted to make working solutions by mixing 33 wt. % of concentrate with 67 wt. % of "corrosive water" (deionized water containing 300 ppm. each of $SO_4^=$, $HCO_3^-$ and $Cl^-$, all added as the Na salts).

B. Laboratory Disc Heat Flux Test: Method, Apparatus and Results

A test method used in the industry was employed to determine the inhibitory effect of the formulated composition of the present invention with respect to heat rejecting aluminum surfaces. This test method is described in Corrosion, 15, 257t at 258t (1959) "Laboratory Methods for Determining Corrosion Rates Under Heat Flux Conditions and also in an ASTM textbook entitled, "Engine Coolant Testing: State of the Art", a symposium sponsored by ASTM Committee D-15, at pages 17-19 (Printed, May 1980), both incorporated herein by reference. A summary of the test equipment and procedure follows:

The apparatus consists of a 1 liter flask, fitted with a condenser, a thermometer, a cold finger, a temperature controller, a 1½ inch diameter×¼ inch thick No. 319 aluminum casting alloy (herein "the aluminum disc"), and a soldering iron heat source.

The apparatus was charged with 750 ml. of test solution and heated to effect boiling at the aluminum disc surface and to maintain a solution temperature of 74° C. The test duration was 168 hours. The weight loss of aluminum from the aluminum disc was determined and used as a measure of corrosion inhibitor effectiveness.

The results are given in Table II which follows:

TABLE II

| Test Solution | Wt. % Grafted Polymer | Wt. % Base Polyether | Wt. % vinyl-trimeth-oxy-silane | ppm Contained Si | Wt. Loss (mg.) | % Inhibition** |
|---|---|---|---|---|---|---|
| 1 | — | — | — | — | 391 | 0 |
| 2 | 0.264 | — | — | 50 | 17 | 96 |
| 3 | 0.528 | — | — | 100 | 9 | 98 |
| 4 | — | — | 0.021 | 50 | 425 | −9 |
| 5 | — | — | 0.052 | 100 | 433 | −11 |
| 6* | — | 0.238 | 0.026 | 50 | 343 | 12 |

*ungrafted mixture of 0.238 wt. percent of the base polymer of Table I and 0.026 wt. percent of vinyltrimethoxysilane.
**% Inhibition is calculated as follows:
[Wt. loss of control #1 − wt. loss of test solution (#2, 3, 4, 5 or 6)] × 100 / Wt. loss of control #1

It is surprising that the weight loss of 17 mg. for test solution #2 using Grafted Polymer A is far lower than the weight loss for test solution #6 using the base polymer of Table I and vinyltrimethyoxysilane in identical amounts as for test solution #2 but in ungrafted form and giving a weight loss of 343 mg. Note that the control run, test solution #1, had a weight loss of 391 mg.

It is unexpected that the starting materials themselves including the vinyltrimethoxysilane (test solutions 4 and 5) and the vinyltrimethoxysilane mixed with ungrafted base polymer (test solution 6) provide essentially no corrosion inhibition on the aluminum sample (−9%, −11% and 12% inhibition, respectively) as compared to 96% and 98% inhibition for test solutions 2 and 3 of the present invention.

We claim:

1. An aluminum corrosion inhibitor composition concentrate comprising:
   (a) alcohol or water or mixtures thereof, and
   (b) an ethylenically unsaturated alkylene silane monomer grafted onto a polyalkylene oxide polymer comprising the reaction product of said ethylenically unsaturated grafting silane monomer and a base polymer consisting of a poly(oxyalkylene) compound of the formula:

$R''((OC_nH_{2n})_zOR')_a$ 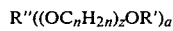

wherein R' is a member selected from the group consisting of a hydrocarbon radical, a hydrogen atom, or an acyl radical and R" is a member selected from the group consisting of a hydrocarbon radical, a hydrogen atom, an amine-containing radical, or an acyl radical, a is an integer having a value of 1 to about 4, n has a value of 2 to 4 inclusive, z is an integer having a value of from 4 to 2300 inclusive, said grafted polymer having a percent silane graft of up to about 60%, said base polymer having a number average molecular weight of between about 200 and about 100,000, and wherein the amount of component (b) is between greater than about 0.01 wt. % and about 20 wt. % based on the total amount of component (a) plus component (b) in said concentrate.

2. The concentrate of claim 1 to which additionally is added:
   (c) ammonium hydroxide, alkali metal hydroxides, or alkaline earth metal hydroxides; or amines, or mixtures thereof.

3. The concentrate of claim 2 wherein component (c) is sodium or potassium hydroxide or triethanolamine, or mixtures thereof.

4. The concentrate of claim 1 wherein component (b) is soluble in component (a) to the extent of at least about 0.01 weight percent based on the weight of the concentrate.

5. The concentrate of claim 4 wherein component (a) is ethylene glycol.

6. The concentrate of claim 2 wherein the reaction product of component (b) and component (c) is soluble in component (a) to the extent of at least about 0.01 weight percent based on the weight of the concentrate.

7. The concentrate of claim 2 wherein the reaction product of component (b) and component (c) is insoluble in component (a).

8. The concentrate of claim 1 wherein component (b) is insoluble in component (a).

9. The concentrate of claim 1 wherein component (a) is ethylene glycol, said base polymer is a poly(oxyethylene-oxypropylene) compound having a number average molecular weight between 200 and 10,000, and said percent graft is between about 1% and about 20%.

10. An aluminum corrosion inhibitor composition comprising:
    (a) alcohol or water or mixtures thereof, and
    (b) ethylenically unsaturated alkylene silane monomer grafted onto a polyalkylene oxide comprising the reaction product of said ethylenically unsaturated grafting silane monomer and a base polymer consisting of a poly(oxyalkylene) compound of the formula:

$R''((OC_nH_{2n})_zOR')_a$ 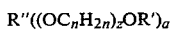

wherein R' is a member selected from the group consisting of a hydrocarbon, a hydrogen atom, or an acyl radical and R" is a member selected from the group consisting of a hydrocarbon a hydrogen atom, an amine-containing, or an acyl radical, a is an integer having a value of 1 to about 4, n has a value of 2 to 4 inclusive, z is an integer having a value of from 4 to 2300 inclusive, said grafted polymer having a percent silane graft of up to about 60%, said base polymer having a number average molecular weight of between about 200 and about 100,000 and wherein the amount of component (b) is between greater than about 0.01 wt. % and about 20 wt. % based on the total amount of component (a) plus component (b) in said concentrate.

11. The composition of claim 10 to which additionally is added:
(c) ammonium hydroxide, alkali metal hydroxides, or alkaline earth metal hydroxides; or amines.

12. The composition of claim 11 wherein component (c) is sodium or potassium hydroxide or triethanolamine.

13. The composition of claim 10 wherein component (b) is soluble in component (a) to the extent at least about 0.01 weight percent based on the weight of the composition.

14. The composition of claim 13 wherein component (a) is ethylene glycol.

15. The composition of claim 11 wherein the reaction product of component (b) and component (c) is soluble in component (a) to the extent of at least about 0.01 weight percent based on the weight of the composition.

16. The composition of claim 12 wherein the reaction product of component (b) and component (c) is insoluble in component (a).

17. The composition of claim 11 wherein component (b) is insoluble in component (a).

18. The composition of claim 10 wherein component (a) is ethylene glycol, said base polymer is a poly(oxyethylene-oxypropylene) compound having a number average molecular weight between 200 and 10,000, and said percent graft is between about 1% and about 20%.

19. A method for providing aluminum-corrosion inhibition in an aluminum component heat transfer system which comprises filling said system with a composition comprising:
(a) alcohol or water or mixtures thereof, and
(b) an ethylenically unsaturated alkylene silane monomer grafted onto a polyalkylene oxide comprising an unsaturated grafting silane and a base polymer consisting of a poly(oxyalkylene) compound of the formula:

$$R''((OC_nH_{2n})_zOR')_a$$

wherein R' is a member from the group consisting of a hydrocarbon radical, a hydrogen atom, or an acyl radical and R" is a member selected from the group consisting of a hydrocarbon radical, a hydrogen atom, an amine-containing radical, or an acyl radical, a is an integer having a value of 1 to about 4, n has a value of 2 to 4 inclusive, z is an integer having a value of from 4 to 2300 inclusive, said grafted polymer having a percent silane graft of up to about 60%, said base polymer having a number average molecular weight of between about 200 and about 100,000 and wherein the amount of component (b) is between greater than about 0.01 wt. % and about 20 wt. % based on the total amount of component (a) plus component (b) in said concentrate.

20. The method of claim 19 which comprises the additional step of adding to said composition:
(c) ammonium hydroxide, alkali metal hydroxides, or alkaline earth metal hydroxides; or amines.

21. The method of claim 20 wherein component (c) is sodium or potassium hydroxide or triethanolamine.

22. The method of claim 19 wherein component (b) is soluble in component (a) to the extent at least about 0.01 weight percent based on the weight of the composition.

23. The method of claim 22 wherein component (a) is ethylene glycol.

24. The method of claim 20 wherein the reaction product of component (b) and component (c) is soluble in component (a) to the extent of at least about 0.01 weight percent based on the weight of the composition.

25. The method of claim 20 wherein the reaction product of component (b) and component (c) is insoluble in component (a).

26. The method of claim 19 wherein component (b) is insoluble in component (a).

27. The method of claim 19 wherein component (a) is ethylene glycol, said base polymer is a poly(oxyethylene-oxypropylene) compound having a number average molecular weight between 200 and 10,000, and said percent graft is between about 1% and about 20%.

28. The method of claim 19 wherein said heat transfer system is a cooling system.

29. The concentrate of claim 1 wherein the amount of component (b) is between about 0.1 wt. % and about 15 wt. % and is based on the total amount of component (a) plus component (b) in said concentrate.

30. The composition of claim 10 wherein the amount of component (b) is between about 0.1 wt % and about 15 wt. % and is based on the total amount of component (a) plus component (b) in said composition.

31. The method of claim 19 wherein the amount of component (b) is between about 0.1 wt. % and about 15 wt. % and is based on the total amount of component (a) plus component (b) in said composition.

* * * * *